United States Patent

Eisner et al.

[11] Patent Number: 5,838,773
[45] Date of Patent: Nov. 17, 1998

[54] PERSONAL READER CAPTURE TRANSFER TECHNOLOGY

[75] Inventors: Meyer W. Eisner, Bensalem; Stanley G. Scwartz, Philadelphia, both of Pa.

[73] Assignee: Belco Systems Technology Corp., Langhorne, Pa.

[21] Appl. No.: 871,526

[22] Filed: Jun. 9, 1997

Related U.S. Application Data

[63] Continuation of Ser. No. 512,798, Aug. 8, 1995, abandoned.

[51] Int. Cl.⁶ .................................................. H04M 11/00
[52] U.S. Cl. ................................ 379/91.01; 379/93.26; 379/93.02
[58] Field of Search .............................. 379/91.01, 93.08, 379/93.02, 93.03, 93.09, 93.12, 93.26; 235/380, 382, 379

[56] References Cited

U.S. PATENT DOCUMENTS

| | | |
|---|---|---|
| 3,655,947 | 4/1972 | Yamamoto et al. . |
| 3,800,283 | 3/1974 | Gropper . |
| 4,454,414 | 6/1984 | Benton . |
| 4,482,802 | 11/1984 | Aizawa et al. . |
| 4,529,870 | 7/1985 | Chaum . |
| 4,654,482 | 3/1987 | DeAngelis . |
| 4,654,513 | 3/1987 | Hennessy . |
| 4,659,914 | 4/1987 | Kondo et al. . |
| 4,689,478 | 8/1987 | Hale et al. . |
| 4,795,890 | 1/1989 | Goldman . |
| 4,816,655 | 3/1989 | Musyck et al. . |
| 4,860,341 | 8/1989 | D'Avello et al. . |
| 4,868,846 | 9/1989 | Kemppi . |
| 4,870,259 | 9/1989 | Boggan et al. . |
| 4,897,865 | 1/1990 | Canuel . |
| 4,901,068 | 2/1990 | Benton et al. . |
| 4,926,325 | 5/1990 | Benton et al. . |
| 4,975,942 | 12/1990 | Zebryk . |
| 5,146,067 | 9/1992 | Sloan et al. . |
| 5,157,717 | 10/1992 | Hitchcock . |
| 5,162,638 | 11/1992 | Diehl et al. . |
| 5,221,838 | 6/1993 | Gutman et al. . |
| 5,239,166 | 8/1993 | Graves . |
| 5,266,782 | 11/1993 | Alanara et al. . |
| 5,283,829 | 2/1994 | Anderson . |
| 5,336,870 | 8/1994 | Hughes et al. . |
| 5,351,296 | 9/1994 | Sullivan . |
| 5,352,876 | 10/1994 | Watanabe et al. . |
| 5,388,148 | 2/1995 | Seiderman . |
| 5,408,513 | 4/1995 | Busch, Jr. et al. .................. 379/91 |
| 5,465,291 | 11/1995 | Barrus et al. ..................... 379/91 |
| 5,513,250 | 4/1996 | McAllister ....................... 379/91 |
| 5,524,072 | 6/1996 | Labaton et al. .................. 380/24 |

FOREIGN PATENT DOCUMENTS 2 208 057  2/1989  United Kingdom .

*Primary Examiner*—Stella Woo
*Attorney, Agent, or Firm*—Burns, Doane, Swecker & Mathis, L.L.P.

[57] ABSTRACT

A method and apparatus for performing electronic financial transactions is disclosed having a card reader which may determine if the card being read is authorized for use with the card reader. The card reader also has a serial number which is sent to a clearing house at the time a request for authorization is made to validate the use of the card reader. Card data and the card reader's serial number are converted to DTMF tones at a customer's location and are sent to a merchant over conventional telephone lines thereby making a standard modem unnecessary. The DTMF tones are decoded at the merchants location and the data is sent by point-of-sale terminal to a clearing house for authorization. Furthermore, a traditional conversation may proceed with a merchant over the same telephone line as that by which the DTMF tones are being sent, eliminating the need for a second line at the customer's location.

20 Claims, 5 Drawing Sheets

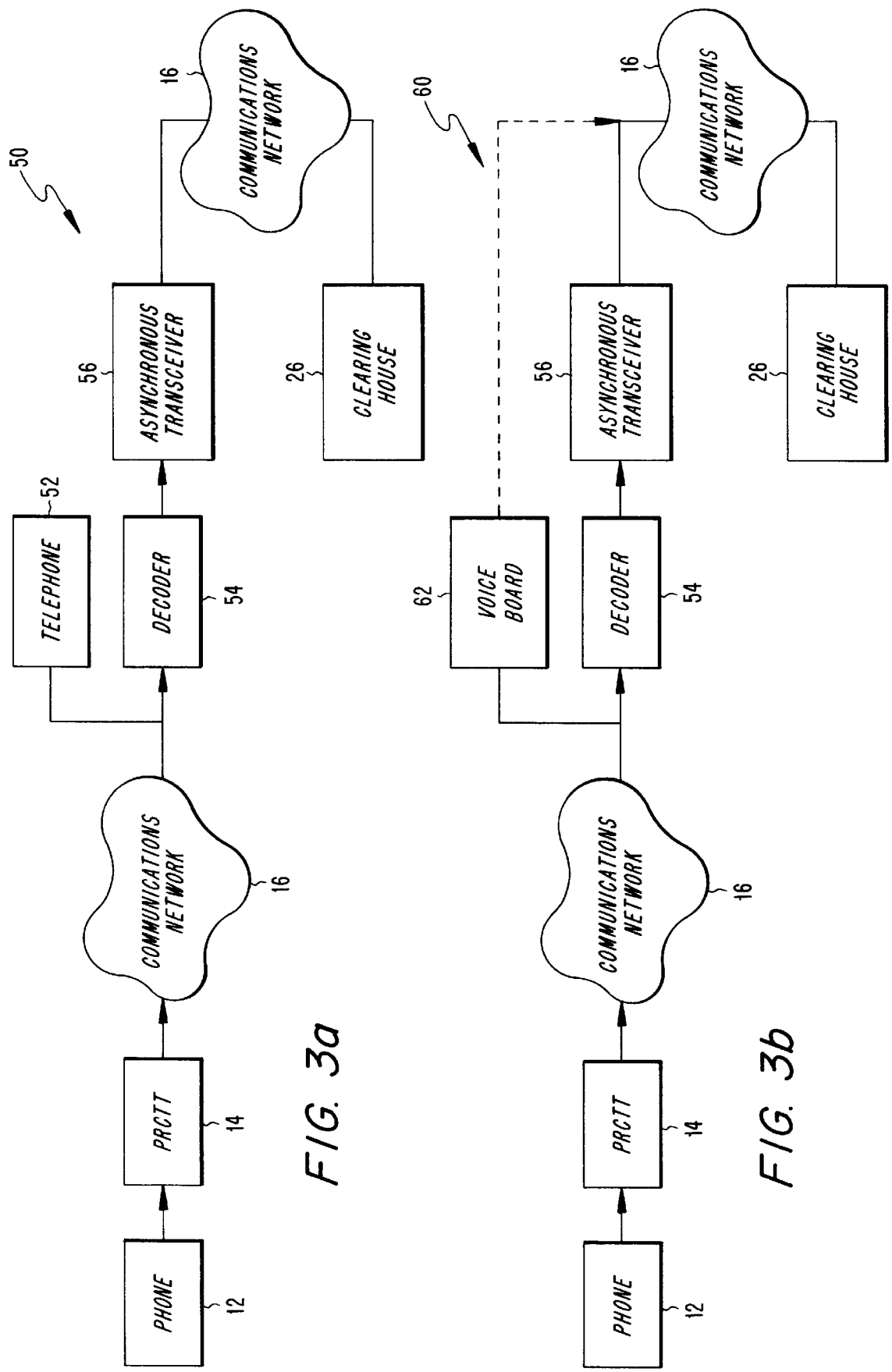

PERSONAL READER CAPTURE TRANSFER TECHNOLOGY

This application is a continuation application of Ser. No. 08/512,798, filed Aug. 8, 1995, now abandoned.

BACKGROUND OF THE INVENTION

1. Field of the Invention

The present invention relates generally to secure electronic financial transactions and more particularly to a secure electronic financial transaction system which can provide financial transaction card authorization through a secured data transmission to a merchant at the time a user wishes to purchase an item from his or her home, office, or other location remote from the merchant.

2. Description of the Prior Art

Electronic funds transfer (EFT) systems such as automated teller machines (ATM) and point-of-sale terminals (POS) have become widely implemented throughout the industrialized world. Some compelling reasons for providing such technologies would include, instant accessibility to funds for purchasing items or paying bills, financial account inquiries and funds transfer, and, reducing the amount of cash funds someone may have to carry on a daily basis thereby reducing the incentive for criminal activity.

These goals have been well accomplished but for the latter. Criminal activity associated with EFT systems is common. Financial transaction cards such as credit cards, bank cards, and the like are often stolen. In fact, the magnetically encoded information contained on cards such as those mentioned may be easily reproduced and applied to a card carried by an unauthorized user.

Many merchants using POS terminals do not implement any additional measures to assure that an authorized user is in fact using the card. A second piece of identification is not often presented nor is a personal identification number (PIN) required. A stolen or illegally fabricated card may be used until the card's limit is reached or until a hold on the card by the card issuing institution is put into effect.

Many EFT systems do require a PIN before a transaction can be authorized. Unfortunately, PINs are often carried by the card holders so as to not forget them. Furthermore, it is sometimes difficult to conceal a PIN when entering it in an ATM or POS terminal. Regardless of how a PIN is obtained by an unauthorized user, it is in fact common, and fraudulent use of credit cards and the like is of great concern to financial institutions, merchants, and users alike.

One reason for this concern is the increasing problem of charge backs. A charge back occurs when a credit card purchase is disputed by a customer. Disputes may occur for many reasons. For instance, an item may be damaged when received by the customer, or an item may be unwanted or unacceptable. Since there is no way to positively identify a remote customer, a card holder may claim he or she never ordered the item in the first. This is often the case when a card is stolen. However, in some instances, such a claim is merely an excuse to avoid making payment. Whether legitimate or fraudulent, once a purchase, remote or otherwise, is disputed, the card issuing institution withdraws funds from a merchant's account to cover the purchase price of the item in dispute. The money is "frozen" by the card issuing institution until the dispute has been resolved. Additional fees are incurred by the merchant to cover transaction and processing expenses billed by the card issuing institution. Settlement of the dispute may not occur for an indefinite amount of time during which the merchant has lost use of its money, the card issuing institution may lose a merchant as a client, and in some cases a merchant may be forced out of business. Business is hindered and discouraged, merchant accounts are denied and highly restricted. Ultimately, consumers pay to maintain these losses through higher purchase prices and higher interest rates. Reducing the amount of fraudulent charges and therefore the frequency of charge backs, is highly desirable.

Although fraudulent use of credit cards and the like warrant great concern, use of electronic financial transaction systems in commerce, particularly, in remote purchases and home shopping transactions, continue to grow at an astonishing rate. It is inevitable that with the proliferation and expanding capabilities of wide area networks (WANs) and more specifically the Internet, more and more commerce will be conducted from a site remote from any particular vendor. Hence, a secure, reliable, inexpensive, and user-friendly system for performing such transactions is required to realize the incredible potential modern technology will afford in the business world of the very near future. In addition, there is tremendous potential afforded through the extensive home- and office-based consumer market.

SUMMARY OF THE INVENTION

It is therefore an object of the present invention to provide a system for remote electronic financial transactions with improved security means.

A further object of this invention is to provide a system for remote electronic financial transactions comprised of commonly attainable commercial hardware.

It is another object of this invention to provide a system for remote electronic financial transactions employing a user-friendly hardware interface.

It is yet another object of this invention to provide a system for remote electronic financial transactions which is cost effective.

It is still another object of this invention to provide a system for remote electronic financial transactions which may be operated over common public switched telephone networks.

It is another object of this invention to provide a system for remote electronic financial transactions wherein the electronically transferred information contained on a financial transaction card may be transferred over the same telephone line as that which traditional merchant/customer relations are possible.

A further object of this invention is to provide a system for remote electronic financial transactions wherein electronically transferred card information is transmitted without the use of a traditional modem.

Briefly, these and other objects may be achieved by a system comprising a telephone, a card reader unit to read magnetically encoded information on a financial transaction card, which provides immediate card validation, and has a digitally encoded serial number. The system further having a digital to analog dual tone multi-frequency (DTMF) tone generator, a DTMF decoder and common telephone switching apparatus. The system may optionally utilize an interactive voice response system (IVR).

Other objects, features, and advantages of the present invention will be apparent from the following detailed description and the accompanying drawings.

BRIEF DESCRIPTION OF THE DRAWINGS

The invention will be further described in conjunction with the accompanying drawings, in which:

FIG. 3a is one possible uncomplicated system for secure financial transactions in accordance with a preferred embodiment of the present invention;

FIG. 3b is an uncomplicated system employing automated ordering, in accordance with a preferred embodiment of the present invention; and, FIGS. 4a and 4b represent a flow chart describing how a financial transaction may proceed using the system of the present invention.

DETAILED DESCRIPTION OF THE PREFERRED EMBODIMENT

Figure 1:
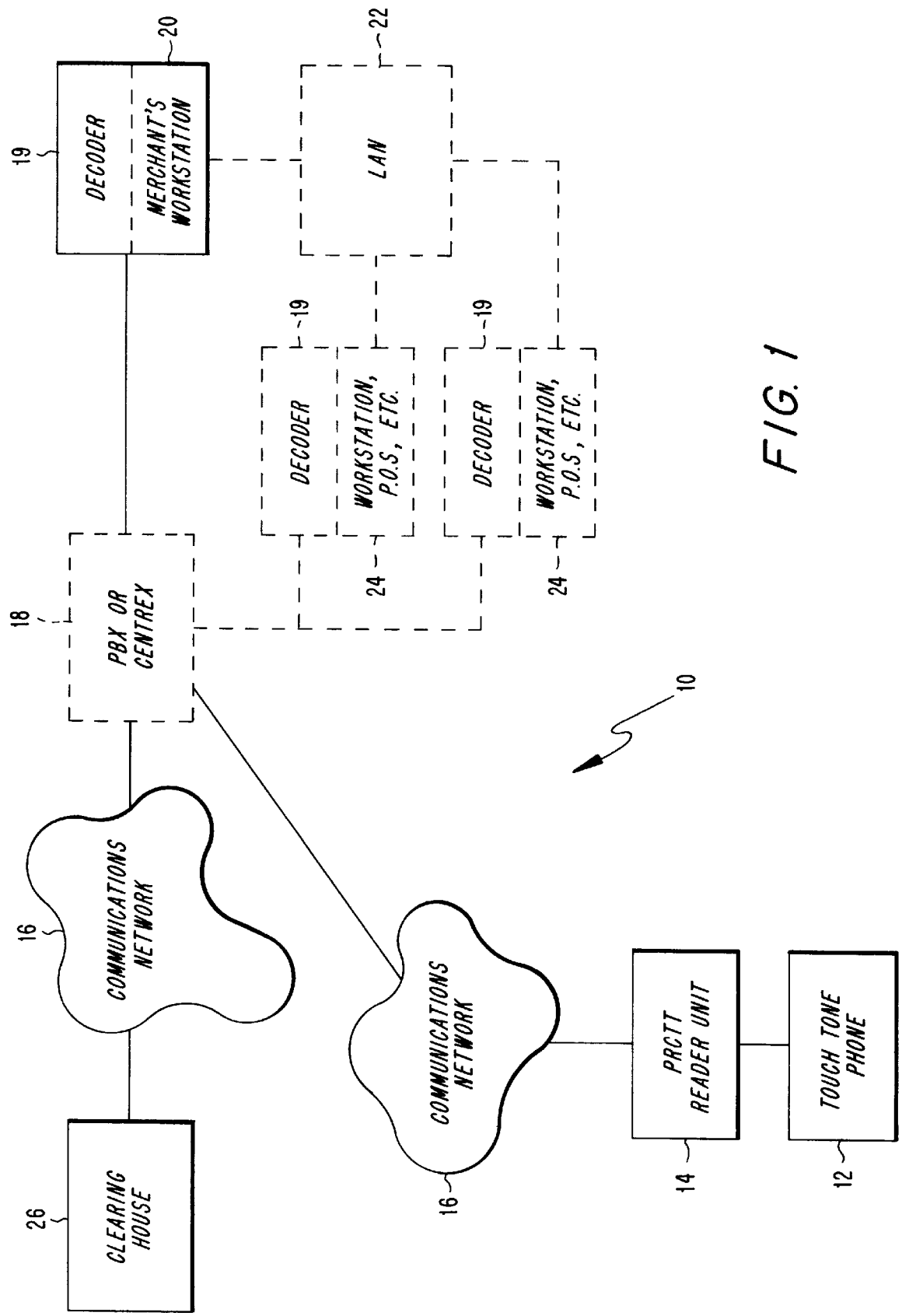
FIG. 1 is a graphic representation of a system for secure financial transactions in accordance with a preferred embodiment of the present invention.

With reference to the figures, wherein like reference numbers indicate like elements throughout the several figures and, in particular, with reference to FIG. 1, an electronic financial transaction system 10, is depicted. System 10 is comprised of the following system elements: touch tone phone 12; personal reader capture transfer technology unit (PRCTT) 14; communications network 16; private branch exchange (PBX) or Centrex service unit 18; decoder 19; merchants workstation 20; local area network (LAN) 22; live agent workstations, terminals, or point-of-sale (POS) units 24; and clearing house for the approval or denial of credit authorization 26.

Phone 12 and PRCTT 14 may be located at a customer's residence, business or other location remote from a merchant, as long as access to a phone line is provided. Communications network 16, which may be a public switched telephone network (PSTN) connects a customer to a merchant's location. PBX 18 may be used to direct incoming calls to different sites at the merchant's location as well as direct outgoing calls to off-site locations as is well known. It should be appreciated that a PBX, Centrex or other exchange unit is optional to the system of the present invention.

A decoder 19 is used to act upon the information sent from phone 12 and PRCTT 14 in a manner which will be discussed with reference to FIGS. 3a and 3b. Decoder 19 may be contained in, or separate from, workstation 20. Workstation 20 may comprise interactive voice response (IVR) hardware and software. IVR hardware and software receives and processes information sent from phone 12 and PRCTT 14 and interfaces with a central processing unit (CPU) in workstation 20. It should be noted that the use of the term "IVR" relates generally to systems that interface with a computer, prompting and/or accepting input in response to a vocal message. It should be further understood that the "vocal message" may be prerecorded, digital or analog, as with menu driven automated ordering systems, or the vocal message may be a request from a salesperson to a customer to enter certain information such as a catalog item number using a touch tone phone or similar device. The hardware associated with having these capabilities are commonly referred to as voice boards. A given voice board may have very different capabilities and features from another. Selection of a particular voice board would depend on the specific application for which it is to be used.

LAN 22 may be implemented at a merchant's site to save information pertaining to the merchant's customers and products and allow sales representatives, or live agents, at workstations 24 to access this information from a common data storage system. This feature, too, is optional as a small business may only require a single computer. Also, workstation 24 may contain decoders 19 as well.

Clearing house 26 receives financial transaction card information from the merchant and approves or denies authorization based on the costumer's line of credit, the funds available in the customer's account, or whether the card has been invalidated. PRCTT 14 may contain a unit serial number which may be validated as well by the clearing house, in accordance with the present invention, as will be later discussed.

FIG. 1 is representative of the type of environment in which the system of the present invention could be implemented. However, a simplified system shall be presented which identifies the fundamental elements of the present invention. It should be obvious to those skilled in the art that many peripheral components may also be used.

Figure 2:
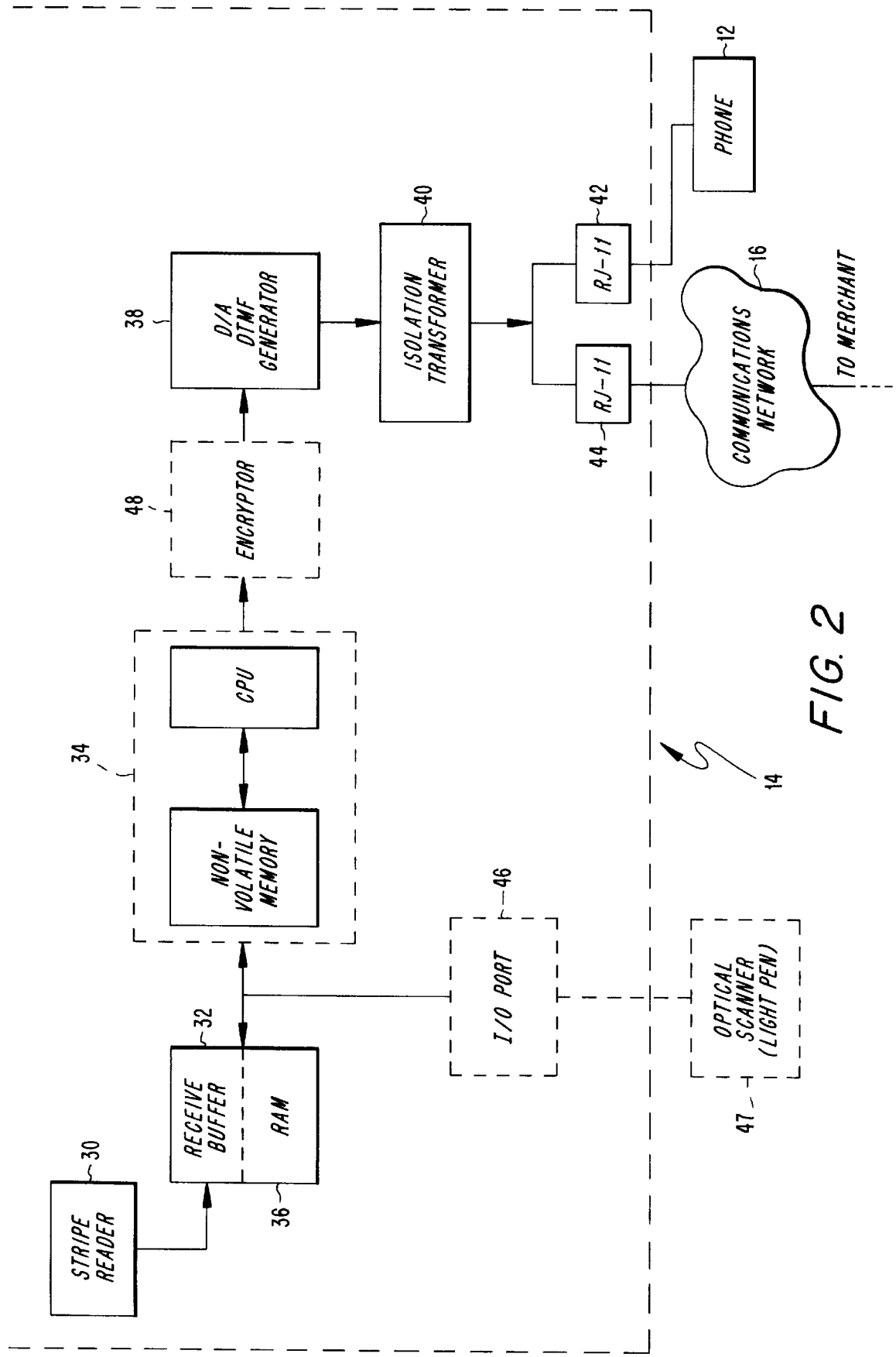
FIG. 2 is a block diagram of the personal reader capture transfer technology unit in accordance with a preferred embodiment of the invention.

Referring now to FIG. 2, which depicts in block diagram form, the internal components of a preferred embodiment of PRCTT 14, namely: magnetic strip reader 30; receive buffer 32; single chip computer 34; RAM 36; digital to analog DTMF tone generator 38; isolation transformer 40; telephone-in jack 42; line-out jack 44; I/O port 46; and optional encryptor 48. An optional scanner 47, such as a light pen, is also depicted.

Magnetic stripe reader 30 has read head(s) positioned next to a bi-directional hand-swipe card slot and will accept and read cards which conform to ISO 7810 and ISO 7811 standards. The term "card" will, from this point forward, refer to standardized financial transaction cards such as credit cards, debit cards, bank cards, and the like. When a card is properly passed through the card slot in the magnetic stripe reader 30, a read head senses the magnetically encoded information contained on the card and outputs this information to receive buffer 32. This information is typically the card holder's name and address, account information, information identifying the card issuer, card expiration date and perhaps a personal identification number (PIN). Receive buffer 32 temporarily stores the data, electronically isolates the read head from single chip computer 34 and provides an appropriate output to single chip computer 34. The memory required in receive buffer 32 may be separate from or integral with additional random access memory (RAM) to be later identified. In a preferred embodiment, single chip computer 34 is an Intel 8085 chip having a CPU and nonvolatile memory, i.e. ROM and EEPROM, in a single package. It should be appreciated by those skilled in the art that an Intel 8051 micro controller or other comparable device may be substituted for the 8085 chip. Also, it is not required that a single chip having CPU, ROM and EEPROM be used. Each element may be provided in a separate package. Programmed in EEPROM is a serial number which is specific to PRCTT 14 at a specific remote location. This serial number is included with the card information contained on a card's magnetic stripe and is transmitted to a merchant along with any other relevant information.

Optionally, EEPROM contained in single chip computer 34 may also be programmed with data corresponding to information encoded on a customer's specific card. Data specific to that customer, such as a home or business address may be used. Billing preference information may also be included such as preferred billing address, etc. In this case, both the serial number and the information corresponding to the customer's card are programmed by a manufacturer and/or PRCTT distribution company before the PRCTT unit is made available to the customer.

The information on a customer's card once swiped, is stored in RAM 36. If EEPROM contains the optional data specific to the customer, i.e., customer's address data, the address data read of the customer's card is compared to the address data programmed into EEPROM. If the data programmed to EEPROM is identical to that on the card, the card is deemed valid for use in that particular PRCTT unit. Having been validated, the card data stored in RAM 36, as well as the serial number of PRCTT 14, is encoded by the CPU in single chip computer 34. If the optional data is not programmed in EEPROM, card validation at PRCTT 14 is not possible.

Once the card data and the serial number of PRCTT 14 are encoded, al the data is represented by twelve possible digital codes. Single chip computer 34 outputs the newly encoded data to tone generator 38, which converts the data to analog tones corresponding to the twelve tones generated by a touch tone phone or other device conforming to the dual tone multi-frequency (DTMF) standard. The preferred embodiment utilizes a Mitel #MT8888C/C-1 transceiver with an Intel micro controller interface for tone generation, which is available from Mitel Semiconductor in Mount Dora, Fla. Other DTMF generators may be used as should be evident to those skilled in the art. The tonal data is output from tone generator 38 to isolation transformer 40 at the input winding. Phone 12 is connected to PRCTT 14 by a phone line, at telephone-in jack 42 which is tapped into isolation transformer 40 along the output winding. In this way, the card data, PRCTT 14 serial number and phone 12 output, are combined, or "piggy backed" on the same output. The combined data is outputted at line out jack 44 which is connected to communication network 16. Both phone in jack 42 and line out jack 44 may be standard RJ-11 jacks or any other suitable interface. I/O port 46 may be provided to allow direct coupling to an external computer. A customer ordering from a remote location such as a residence may choose to use a computer's modem or full duplex phone system to send data. In this way the security features of PRCTT 14 are maintained, but the normal output of PRCTT 14 at line out jack 44 is not utilized. I/O port 46 may alternately be used to connect an external device, such as a light pen 47, which could be used to scan bar code information in a merchant's catalog thereby expediting the purchasing process. It should also be noted that an encryptor 48 may be used for additional security of the data transmission. Power to the PRCTT unit may be from a battery pack, a wall outlet or from the phone line.

FIGS. 3a and 3b depict two less complicated environments than that previously depicted in FIG. 1. The first of these environments will be referred to as live agent system 50, and the second will be referred to as automated system 60. In both systems, phone 12, PRCTT 14, communications network 16 and clearing house 26 are depicted and function in the system in the manner previously described. Live agent system 50 further depicts a telephone 52, a decoder 54 and an asynchronous transceiver 56, such as a modem. Telephone 52 is connected to communications network 16 so that a customer may speak directly with a sales representative. A customer wishing to purchase an item would inform the sales representative of the item or items to be purchased. The sales representative would then instruct the customer to swipe his or her card in PRCTT 14. Again, if PRCTT 14 has the optional card validation data in EEPROM, i.e., a customer's address data, validation of the card is checked. If the data on the card matches that previously programmed in the EEPROM in single chip computer 34, all the card data, as well as the serial number of the PRCTT unit, will be converted to tones and transmitted via communications network 16 to the merchant's location as was previously discussed. When received at the merchant's location, the tones, conforming to DTMF standards, are decoded by decoder 54. In the live agent structure, the data may also be available to the agent for viewing on a monitor. Decoder 54 must be suitable for decoding tones conforming to the DTMF standard. One such decoder is The Motorola Dual Tone Multiple Frequency Receiver MC145436 which detects DTMF digits and outputs in 4-bit hexadecimal code. The decoded data is transmitted over communications network 16 via asynchronous transceiver 56 to clearing house 26 for authorization. Transceiver 56 may be contained in a workstation or a dedicated POS terminal. The card data having been sent to clearing house 26 is processed conventionally. The data relating to the serial number of PRCTT 14 is checked against a data base at the clearing house, merchant, and/or a separate service provider's facilities. If the serial number is identified as being that of a PRCTT unit for which the customer's card is authorized for use, the sale may proceed. If such a match is not made, authorization is denied even if all other requirements, such as credit limit, are satisfied. It is important to realize that all that is fundamentally necessary to the system of the present invention at a merchant's location, is a decoder to convert the audio tones back to digital data, and, transceiver means to send the data to a clearing house for authorization, and receive the data either giving authorization or denying authorization. This entire process can proceed while a customer interacts with a merchant without requiring that the card data be sent over a separate telephone line. Additionally, it should be appreciated that, at the merchant's location, the card information may be removed from the voice signal and forward to the clearinghouse for further processing as described above.

Automated system 60 is identical to live agent system 50 except where the merchant's location is concerned. In automated system 60, a voice board 62, such as those available from Dialogic Corporation or Natural Micro systems, is implemented. These and other similar voice boards are used for automated answering and ordering systems. Although a separate decoder (54) and transceiver (56) are depicted, some voice boards may comprise DTMF decoders and modems, making the use of previously mentioned separate components redundant.

It should be understood that wave files, the digitally recorded messages heard when using an automated ordering system, are usually stored on a hard drive or in other memory which may be in a personal computer (not shown). Also, it should be obvious to those skilled in the art that a PIN or other code could be used as a further security means and could be entered via the touch tone phone 12. Use of a PIN for security may be particularly desired when a customer is using a PRCTT unit without card validation information. Such a unit may be used at remote sites such as hotels, college campuses or other sites where many users are anticipated and card validation at the remote site is not practical. Also, PRCTT 14 and phone 12 depicted in FIGS. 1, 2, 3a and 3b, need not be two separate devices.

It should also be understood that while it is possible to transmit card authorization information directly from a customer to an authorization center, rather than through a vendor, this would require designated vendor codes.

Figure 4A:
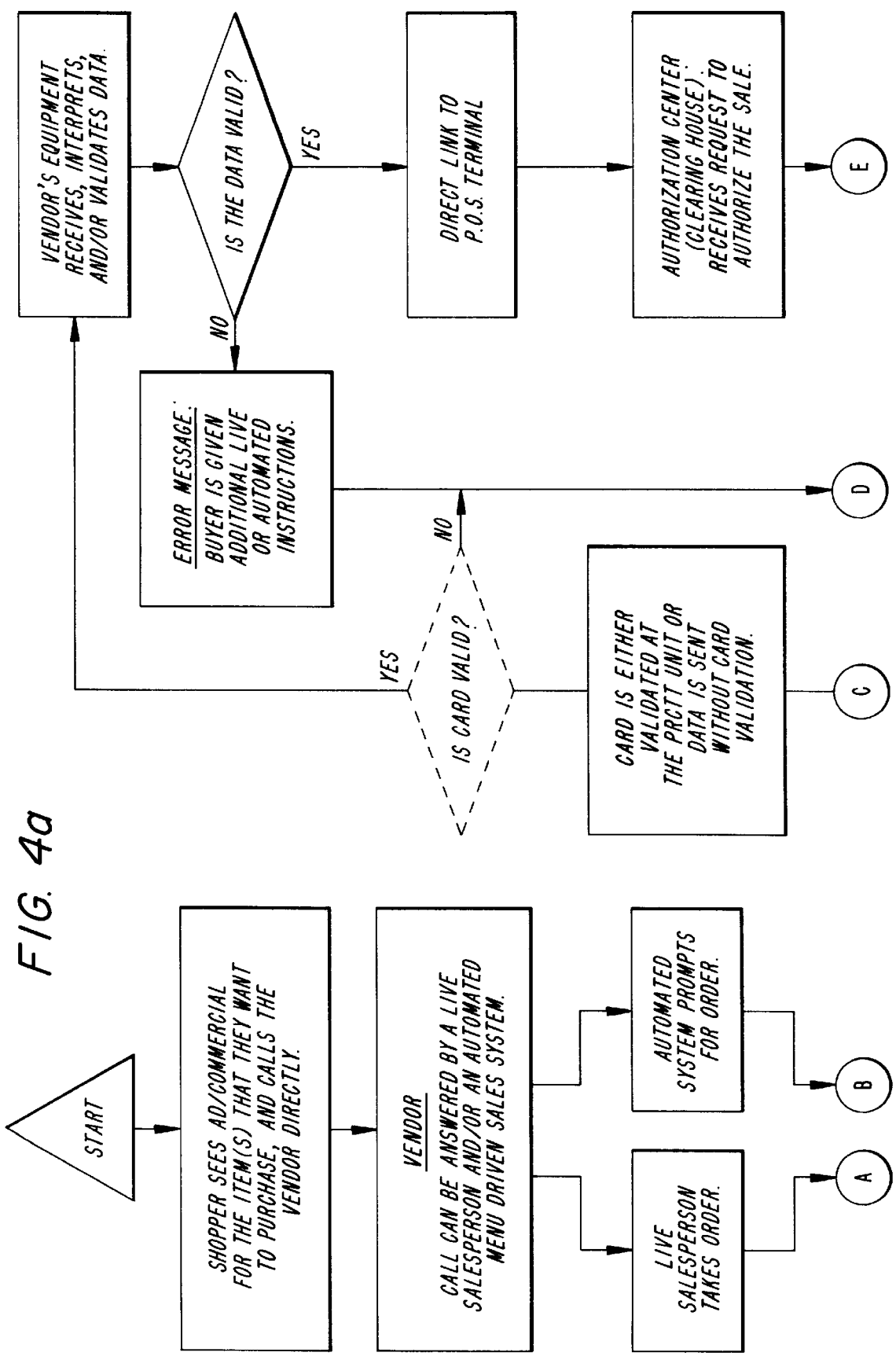
Figure 4B:
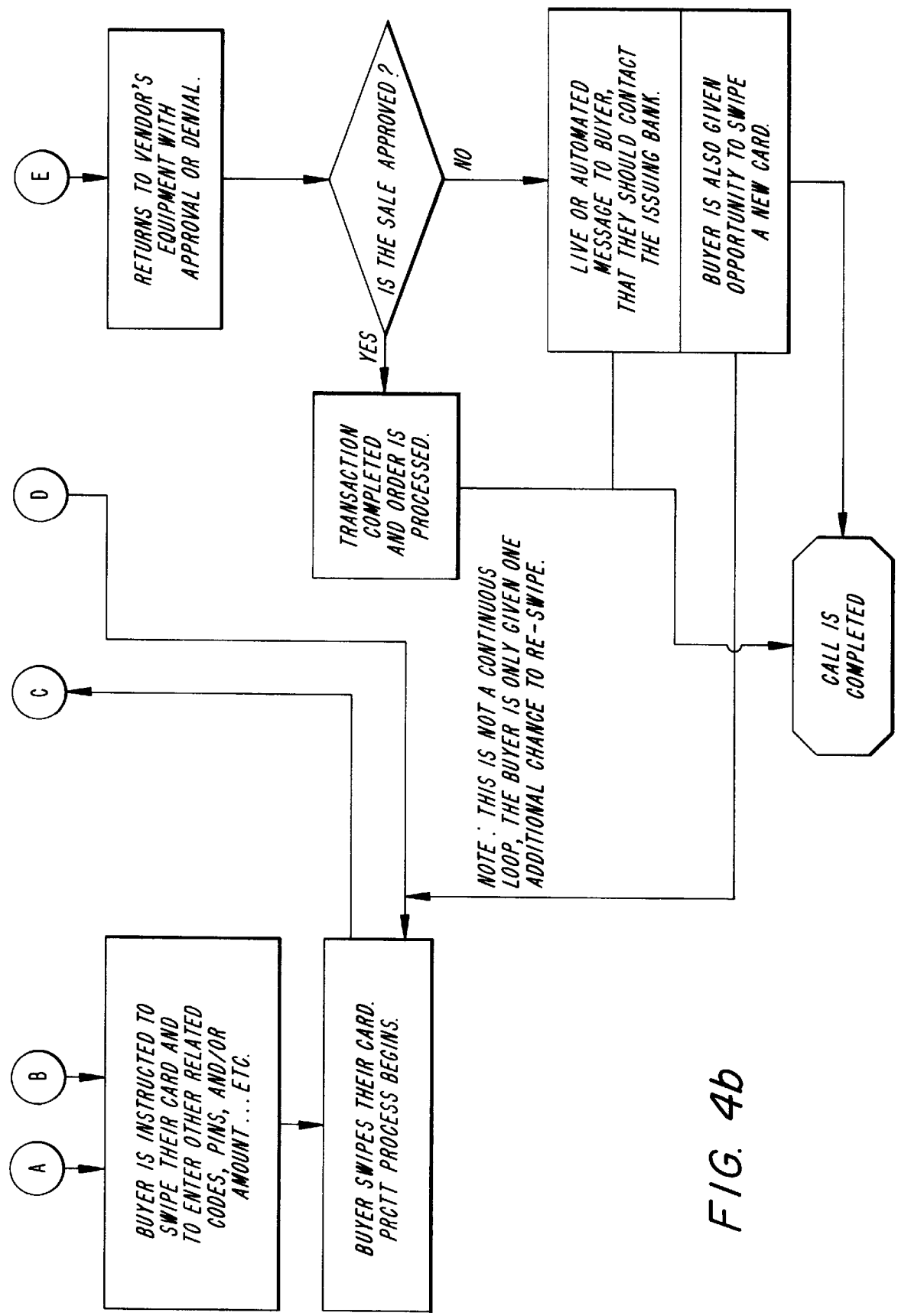

Referring now to FIG. 4, which is a flow chart depicting how a transaction may proceed according to the present invention, a call is placed to a merchant to purchase an item, the call is received and answered either by a live agent, or an automated ordering system. If a live agent handles the sale, he or she takes the order and enters the purchase amount or item number in a POS or workstation. If an automated ordering service is used, the customer will be prompted to enter the item number via a touch-tone phone or other device. The purchase price, as well as other information concerning the purchase, may be stored in a data base. The customer is then instructed to swipe his or her card in the PRCTT unit, either by a live agent or the automated answering system. The card may be determined to be valid or invalid by the PRCTT unit as previously discussed if EEPROM is programmed with the required data. If the card is not valid, the card data and PRCTT serial number are not sent to the merchant and an error will be indicated by LED, LCD or other means at the merchant's site and/or the customer's site. The customer may then swipe another card. The process will not continue until a valid card is swiped.

When a valid card is swiped, the card data and serial number are sent to the merchant where the combined data is decoded and sent to a clearing house for authorization as previously discussed. The PRCTT's serial number is checked at the clearing house and/or the merchant's location to determine that an authorized card has been swiped in an appropriate PRCTT unit. As indicated, the clearing house may require a PIN for approval which may be entered using a touch-tone phone or other DTMF generator. The tones generated by the touch-tone phone will likewise be decoded at the merchant's location and be sent to the clearing house. Once all the information necessary for authorization has been provided to the clearing house, approval or denial of the transaction by the clearing house is returned to the vendor's equipment. If the vendor receives approval, the transaction is now complete. If the purchase is denied the customer may be instructed to swipe another card, contact the card-issuing institution or may be given other options to make the purchase.

What has been disclosed is a system for secure electronic financial transactions which has several advantages over the prior art. Among these advantages is the ability to send card information and converse with a merchant over the same telephone line. Also, a card or cards may only be used with a certain PRCTT unit for purchasing from a particular merchant if so desired. In this way, fraudulent use of such cards is impossible without having both the card and the PRCTT unit, and knowledge of a PIN alone does not allow for fraudulent use. Furthermore, the interface means, namely, a touch tone telephone and card reader, are already familiar to the public which makes the system user friendly. The system described may also be used in very simple or very complex ordering systems without losing the advantage of the security features.

The present invention has been described wherein the information for card authorization has been initially derived from the magnetic stripe of standardized financial transaction cards. It should be understood that other technologies such as IC cards, sometimes referred to as smart cards, which may contain the same information as the magnetic stripe, but in an integrated circuit, may also be used, although, the card reader would be necessarily different.

Although the present invention has been fully described in connection with the preferred embodiment thereof, with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A financial transaction system for allowing a remote user to conduct secure remote point of sale transactions with a remote site by using a financial transaction card, said system comprising:

a customer transaction device, said customer transaction device comprising a magnetic stripe card reader for reading card information from said financial transaction card selected from the group consisting of credit cards, debit cards and bank cards, memory means for storing card information and of storing an identifier for said customer transaction device, means for combining said card information with said identifier to produce transaction information and being able to compare said card information to said stored card information and for enabling transmission of said input card information over a telephone communications path when said input card information is substantially identical to said stored card information, a digital to analog dual tone multi-frequency tone generator for generating a dual tone multi-frequency signal comprising transaction information in cooperation with said computer, and telephonic communication means for transmitting said dual tone multi-frequency signal simultaneously with voice information to a merchant site; and a merchant transaction device, said merchant transaction device comprising means for receiving said dual tone multi-frequency signal comprising transaction information and voice information from said customer transaction device, decombiner means for separating said card information from said identifier, and verification means for verifying said identifier.

2. The financial transaction system recited in claim 1, wherein said merchant transaction device further comprises communication means for transmitting said card information from said merchant transaction device to a clearing-house.

3. The financial transaction system recited in claim 1, wherein said merchant transaction device further comprises an exchange unit for processing multiple signals from multiple customer transaction devices.

4. The financial transaction system recited in claim 1, wherein said merchant transaction device further comprises a local area network and at least one remote computer for receiving said voice information.

5. The financial transaction system recited in claim 1, wherein said merchant transaction device further comprises an interactive voice response means for receiving said voice information and acting thereon.

6. The financial transaction system recited in claim 1, wherein said customer transaction device further comprises an isolation transformer for electrically isolating said customer transaction device from said communication means.

7. The financial transaction system recited in claim 1, wherein said computer of said customer transaction device further comprises means for verifying the authenticity of said card at said customer transaction device, said means comprising a comparator for comparing address information stored on said card with address information stored in said memory.

8. The financial transaction system recited in claim 1, wherein said customer transaction device further comprises encryption means for encrypting said transmission of said transaction information.

9. The financial transaction system recited in claim 1, wherein said customer transaction device further comprises optical input means for optically scanning information which is combined with said transmission of said transaction information and said voice information.

10. A financial transaction system for allowing a remote user to conduct remote point of sale transactions at a remote site by using a financial transaction card, said system comprising:

a customer transaction device including means for inputting card information from said financial transaction card selecting from the group consisting of credit cards, debit cards and bank cards, memory means for storing card information, means for comparing said input card information to said stored card information and for enabling transmission of said input card information over a telephone communications path when said input card information is substantially identical to said stored card information, and communication means including a transmitter for transmitting said card information over said telephone communications path, said transmitter permitting simultaneous voice transmission over said telephone communications path; and a merchant transaction device including means for capturing said card information from said telephone communications path.

11. The financial transaction system recited in claim 10, wherein said means for comparing compares address information stored on said card with address information stored in said memory.

12. The financial transaction system recited in claim 11, wherein said customer transaction device further comprises optical input means for optically scanning information which is combined with said transmission of said transaction information and said voice information.

13. The financial transaction system recited in claim 10, wherein said customer transaction device further comprises optical input means for optically scanning information which is transmitted as a dual tone multi-frequency signal.

14. A financial transaction system for allowing a remote user to conduct remote point of sale transactions at a remote site by using a financial transaction card, said system comprising:

a customer transaction device including means for inputting card information from said financial transaction card selected from the group consisting of credit cards, debit cards and bank cards, memory means for storing card information and for storing an identifier for said customer transaction device, means for comparing said input card information to said stored card information and for enabling transmission of said input card information over a telephone communications path when said input card information is substantially identical to said stored card information, combiner means for combining said card information with said identifier to produce transaction information, and communication means including a transmitter for transmitting said transaction information over said telephone communications path, said transmitter permitting simultaneous voice transmission over said telephone communications path; and a merchant transaction device including means for receiving said transaction information from said customer transaction device, decombiner means for separating said card information from said identifier, and verification means for verifying said identifier.

15. The financial transaction system recited in claim 14, wherein said customer transaction device further comprises encryption means for encrypting said transmission of said transaction information.

16. A customer transaction device comprising:

means for inputting card information from a financial transaction card selected from the group consisting of credit cards, debit cards and bank cards, memory means for storing card information, means for comparing said input card information to said stored card information and for enabling transmission of said input card information over a telephone communications path when said input card information is substantially identical to said stored card information, and communication means including a transmitter for transmitting said card information over said telephone communications path, said transmitter permitting simultaneous voice transmission over said telephone communications path.

17. The customer transaction device recited in claim 16, further comprises encryption means for encrypting said card information.

18. The customer transaction device recited in clam 16, further comprises optical input means for optically scanning information which is transmitted as a dual tone multi-frequency signal.

19. A customer transaction device comprising:

a magnetic stripe card reader for reading card information from a financial transaction card selected from the group consisting of credit cards, debit cards and bank cards, memory means for storing said card information, memory means for storing an identifier of said customer transaction device, means for combining said card information with said identifier to produce transaction information and for comparing said card information to said stored card information and for enabling transmission of said input card information over a telephone communications path when said input card information is substantially identical to said stored card information, a digital to analog dual tone multi-frequency tone generator for generating a dual tone multi-frequency signal comprising transaction information in cooperation with said computer, and telephonic communication means for transmitting said dual tone multi-frequency signal simultaneously with voice information to a merchant site.

20. A method for allowing a remote user of a financial transaction system to conduct secure remote point of sale transactions from a remote site by using a financial transaction card, the method comprising the steps of:

inputting card information from said financial transaction card selected from the group consisting of credit cards, debit cards and bank cards into a customer transaction device;

storing said card information in said customer transaction device;

inputting a voice signal into said customer transaction device;

comparing said input card information to said stored card information and for enabling transmission of said input card information over a telephone communications path when said input card information is substantially identical to said stored card information;

transmitting said card information as a dual time multi-frequency signal which is combined with said voice signal to a merchant site;

receiving said dual time multi-frequency signal which is combined with said voice signal from said customer transaction device; and, separating said card information from said voice signal.

* * * * *